(12) United States Patent
Baer et al.

(10) Patent No.: US 8,430,618 B2
(45) Date of Patent: Apr. 30, 2013

(54) FASTENERS FOR COMPOSITE MATERIAL

(75) Inventors: Robert Baer, Woodridge, IL (US); Lon DeHaitre, Arlington Heights, IL (US); Charles Kadish, Buffalo Grove, IL (US); Mark Romano, River Forest, IL (US); Michael Tipps, Woodstock, IL (US)

(73) Assignee: Abbott-Interfast Corporation, Wheeling, IL (US)

( * ) Notice: Subject to any disclaimer, the term of this patent is extended or adjusted under 35 U.S.C. 154(b) by 0 days.

(21) Appl. No.: 13/311,059

(22) Filed: Dec. 5, 2011

(65) Prior Publication Data

US 2012/0093612 A1 Apr. 19, 2012

Related U.S. Application Data

(63) Continuation of application No. 10/752,431, filed on Jan. 6, 2004, now abandoned.

(60) Provisional application No. 60/471,050, filed on May 16, 2003.

(51) Int. Cl.
*F16B 25/00* (2006.01)
*F16B 25/10* (2006.01)
*F16B 35/04* (2006.01)

(52) U.S. Cl.
USPC ........ 411/387.2; 411/386; 411/399; 411/413; 411/416; 411/424

(58) Field of Classification Search .............. 411/378, 411/386–387.2, 399, 411–413, 416, 418, 411/424
See application file for complete search history.

(56) References Cited

U.S. PATENT DOCUMENTS

| | | | |
|---|---|---|---|
| 112,935 A | 3/1871 | Linsey | |
| 440,334 A | 11/1890 | Rogers | |
| 1,175,665 A | 3/1916 | Sweet | |
| 1,820,556 A | 8/1931 | Campbell et al. | |
| 1,827,628 A | 10/1931 | Twedell | |
| 1,953,305 A | 4/1934 | Maclean | |
| 1,968,516 A | 7/1934 | Dieter | |
| 1,980,093 A | 11/1934 | Rosenberg | |
| 2,024,071 A * | 12/1935 | Taylor et al. | 411/424 |
| 2,056,688 A | 10/1936 | Peterka et al. | |
| 2,292,557 A | 8/1942 | Wilson | |
| 2,419,555 A | 4/1947 | Fator | |
| 2,650,032 A | 8/1953 | Godfrey | |

(Continued)

FOREIGN PATENT DOCUMENTS

DE 101 54 214 5/2003
GB 2 239 920 7/1991

*Primary Examiner* — Victor Batson
*Assistant Examiner* — Tyler Johnson
(74) *Attorney, Agent, or Firm* — Greer, Burns & Crain, Ltd.

(57) ABSTRACT

A fastener has a shaft, a head at a first end of the shaft, and a point at the other end of the shaft. A first portion of the shaft adjacent the point is threaded. The first portion typically extends about one-half the total length of the shaft. A second portion of the shaft (adjacent the head) is not threaded, but has a plurality of spaced rings. A knurled portion can be provided between the first and second portions, if desired. Conventional symmetrical or asymmetrical thread can be used in the threaded portion, or a three lobe thread can be used.

6 Claims, 2 Drawing Sheets

U.S. PATENT DOCUMENTS

| | | | |
|---|---|---|---|
| 2,895,368 A * | 7/1959 | Trigg, Jr. et al. | 411/396 |
| 2,982,166 A | 5/1961 | Hobbs | |
| 3,093,025 A | 6/1963 | Wasserman | |
| 3,106,791 A | 10/1963 | Ball | |
| 3,124,408 A | 3/1964 | Oestereicher | |
| 3,171,146 A * | 3/1965 | Moss et al. | 470/204 |
| 3,177,755 A | 4/1965 | Kahn | |
| 3,180,126 A * | 4/1965 | Carlson | 72/365.2 |
| 3,209,383 A * | 10/1965 | Carlson | 470/204 |
| 3,246,556 A * | 4/1966 | Phipard, Jr. | 411/416 |
| 3,325,135 A | 6/1967 | Clarke | |
| 3,446,262 A * | 5/1969 | Phipard, Jr. | 411/257 |
| 3,478,639 A | 11/1969 | Gruca | |
| 3,524,378 A | 8/1970 | Wieber | |
| 3,682,507 A | 8/1972 | Waud | |
| 3,903,784 A | 9/1975 | Dekker | |
| 3,987,698 A | 10/1976 | Rabe | |
| 4,040,328 A | 8/1977 | Muenchinger | |
| 4,096,901 A | 6/1978 | Reichenbach | |
| 4,194,430 A | 3/1980 | Muenchinger | |
| 4,235,149 A * | 11/1980 | Veldman | 411/417 |
| 4,310,272 A | 1/1982 | Rich et al. | |
| 4,315,340 A * | 2/1982 | Veldman | 470/9 |
| 4,462,730 A | 7/1984 | Knohl | |
| 4,621,963 A | 11/1986 | Reinwall | |
| 4,653,244 A | 3/1987 | Farrell | |
| 4,797,022 A | 1/1989 | Crigger | |
| 4,808,051 A | 2/1989 | Gietl | |
| 4,844,676 A | 7/1989 | Adamek | |
| 4,854,311 A | 8/1989 | Steffee | |
| 4,874,278 A | 10/1989 | Kawashita | |
| 4,951,974 A | 8/1990 | Schabert et al. | |
| 4,959,938 A | 10/1990 | De Caro | |
| 5,015,134 A | 5/1991 | Gotoh | |
| 5,044,855 A | 9/1991 | Fukubayashi | |
| 5,199,839 A | 4/1993 | DeHaitre | |
| 5,217,339 A | 6/1993 | O'Connor et al. | |
| 5,295,774 A | 3/1994 | Roberts | |
| 5,516,248 A * | 5/1996 | DeHaitre | 411/387.2 |
| 5,531,553 A | 7/1996 | Bickford | |
| 5,536,127 A | 7/1996 | Pennig | |
| 5,735,653 A | 4/1998 | Schiefer et al. | |
| 5,779,416 A | 7/1998 | Sternitzky | |
| 5,863,167 A | 1/1999 | Kaneko | |
| 5,897,280 A * | 4/1999 | Dicke | 411/411 |
| 6,000,892 A * | 12/1999 | Takasaki | 411/413 |
| 6,030,162 A | 2/2000 | Huebner | |
| 6,050,765 A | 4/2000 | McGovern et al. | |
| 6,074,149 A | 6/2000 | Habermehl et al. | |
| 6,086,303 A * | 7/2000 | Fluckiger | 411/399 |
| 6,109,850 A * | 8/2000 | Commins | 411/387.2 |
| 6,254,327 B1 | 7/2001 | Chen | |
| 6,264,414 B1 | 7/2001 | Hartmann et al. | |
| 6,325,583 B1 | 12/2001 | Mattle et al. | |
| 6,616,391 B1 * | 9/2003 | Druschel | 411/387.2 |
| 6,666,638 B2 | 12/2003 | Craven | |
| 6,941,635 B2 * | 9/2005 | Craven | 29/525.11 |
| 6,966,737 B2 * | 11/2005 | McGovern et al. | 411/413 |
| 7,037,059 B2 * | 5/2006 | Dicke | 411/413 |
| 7,189,045 B2 * | 3/2007 | McGovern et al. | 411/412 |
| 7,255,523 B2 * | 8/2007 | Laan | 411/411 |
| 7,367,768 B2 * | 5/2008 | McGovern et al. | 411/412 |
| 7,695,228 B2 * | 4/2010 | Craven | 411/413 |
| 7,832,173 B2 * | 11/2010 | Crawford et al. | 52/690 |
| 7,988,396 B2 * | 8/2011 | Weiss et al. | 411/386 |
| 2003/0026675 A1 * | 2/2003 | McGovern et al. | 411/412 |
| 2004/0141827 A1 * | 7/2004 | Dicke | 411/413 |
| 2004/0151559 A1 * | 8/2004 | Craven | 411/413 |
| 2004/0197139 A1 * | 10/2004 | Mcgovern et al. | 403/408.1 |
| 2007/0217887 A1 * | 9/2007 | Lin | 411/413 |
| 2008/0031705 A1 * | 2/2008 | Severns | 411/413 |
| 2009/0097942 A1 * | 4/2009 | Weiss et al. | 411/403 |

* cited by examiner

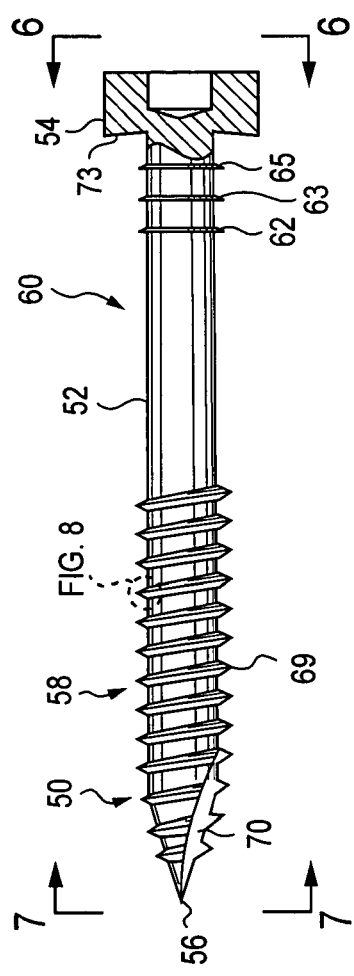
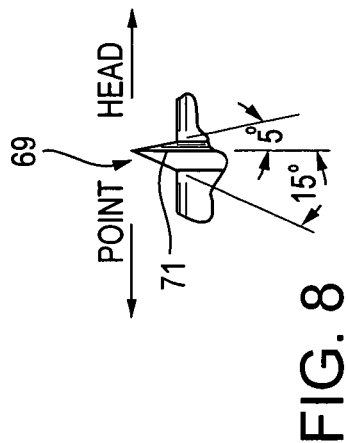
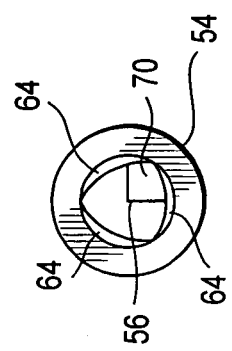
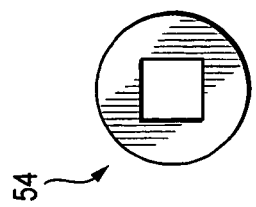
FIG. 5
FIG. 8
FIG. 7
FIG. 6

FASTENERS FOR COMPOSITE MATERIAL

This is a continuation of application Ser. No. 10/752,431, filed Jan. 6, 2004.

This application claims benefits under 35 U.S.C. §120 based on provisional patent application Ser. No. 60/471,050, filed May 16, 2003.

FIELD OF THE INVENTION

This invention relates to fasteners for composite materials, and more particularly, to fasteners that reduce mushrooming and splitting in composite materials without predrilling, while adequately fastening the composite material to a substrate.

BACKGROUND OF THE INVENTION

Modern composite building material is predominantly made of a combination of wood and plastic. Composite material can be used for various purposes, such as outside decks for houses.

When normal screws are used with such composite materials, the material tends to "mushroom" when the screw is countersunk, leaving a bump above the surface of the board. Conventional screws also tend to split the ends of the boards unless holes are pre-drilled, which is labor intensive. Thus, there is a need for screws for composite materials that reduce both mushrooming and splitting.

In many applications, composite material is fastened to an underlying substrate, such as wood. The fasteners must pass through the composite material and be firmly secured to the substrate.

Accordingly, one object of this invention is to provide new and improved fasteners for composite material.

Another object is to provide new and improved fasteners for composite materials that reduce mushrooming when the fastener is countersunk.

Still another object is to provide new and improved fasteners for composite materials that reduce splitting without predrilling.

Yet another object is to provide new and improved fasteners that adequately secure composite material to a substrate.

SUMMARY OF THE INVENTION

In keeping with one aspect of this invention, a fastener has a shaft, a head at a first end of the shaft, and a point at the other end of the shaft. A first portion of the shaft adjacent the point is threaded. The first portion typically extends about one-half the total length of the shaft. A second portion of the shaft (adjacent the head) is not threaded, but has a plurality of spaced rings. A knurled portion can be provided between the first and second portions, if desired. Conventional symmetrical or asymmetrical thread can be used in the threaded portion, or a full three lobe thread can be used.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 5 is a partially cut-away view of a second embodiment of the present invention;

FIG. 6 is an end view of the head of the fastener of FIG. 5;

FIG. 7 is an end view of the threaded portion of the fastener of FIG. 5; and

FIG. 8 is a detailed view of a thread in the fastener of FIG. 5.

DETAILED DESCRIPTION

Figure 1:
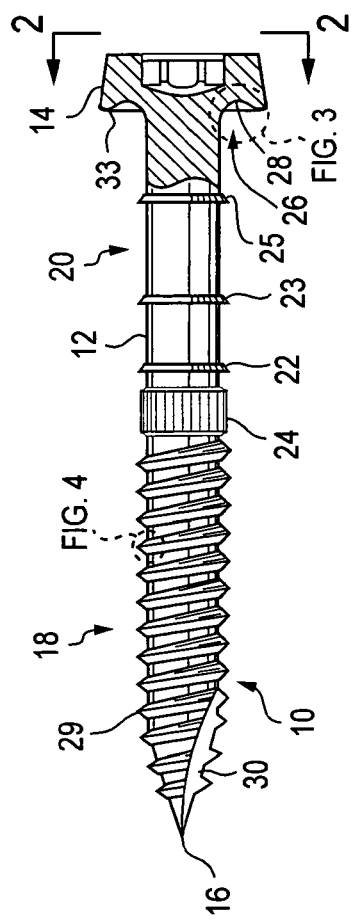
FIG. 1 is a partially cut-away view of one embodiment of a fastener made in accordance with the present invention.

As seen in FIG. 1, a fastener 10 has a shaft 12 and a head 14 on one end of the shaft 12. The other end of the shaft 12 has a point 16, such as an approximately 30° point.

A first portion 18 adjacent the point 16 has a plurality of threads, while a second portion 20 adjacent the head 14 is not threaded. Three rings 22, 23, 25, spaced from each other at predetermined intervals, are provided in the second portion 20. It is contemplated that up to five rings would be suitable, depending on the nature of the material being fastened.

A knurl section 24 can be provided between the first portion 18 and the second portion 20, if desired. The knurl typically has a plurality of teeth oriented parallel to the axis of the shaft.

Figure 3:
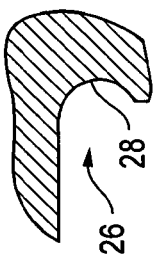
FIG. 3 is an expanded view of the inside of the head of the fastener of FIG. 1.
Figure 2:
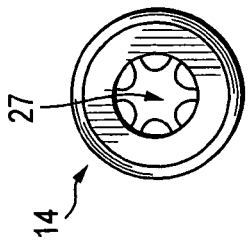
FIG. 2 is a an end view of the head of the fastener of FIG. 1.

The head 14 (FIG. 2) can accept any suitable drive, such as the drive shown in FIG. 2, which has six lobes 27. An inside edge 26 of the head 14 can include an undercut 28, in which the edge is inverted towards the head 14, as seen in FIG. 3.

The rings are generally perpendicular to the axis of the shaft, can have a 50° beveled edge toward the head, and can be about 0.03-0.02 inches thick. In FIG. 1, the spaces between the three rings are unequal. In a No. 8 size screw having 12 threads per inch and a nominal length of about 2.5 inches, the ring 22 can be about 0.560 to 0.540 inches from a bearing surface 33 of the head 14. The ring 23 can be about 0.395 to 0.375 inches from the surface 33, and the ring 25 can be about 0.17 to 0.15 inches from the surface 33. Other screw sizes and lengths can have rings spaced in a similar manner, depending on the material being fastened. Thus, if the total length of the shaft from the inside surface 33 of the head to the point 16 is TL, then the ring 22 can be located about 0.23 TL from the surface 33, the ring 23 can be located about 0.16 TL from the surface 33, and the ring 25 can be located about 0.07 TL from the surface 33.

Figure 4:
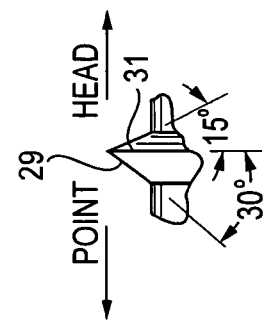
FIG. 4 is a detailed view of the threads of the fastener of FIG. 1.

Threads 29 in the portion 18 can be any suitable thread design, such as the design shown in FIG. 4, in which the surface facing the point 16 is at about a 30° angle to a line (the apex of the thread) perpendicular to the shaft axis, and the surface facing the head 16 is at about a 15° angle to the same line.

A type 17 shank slot 30 or the like is typically provided adjacent the point 16. The slot 30 preferably would remove a full quadrant of the shaft 12 and thread 29.

A second embodiment of the present invention is shown in FIGS. 5-8. A fastener 50 includes a shaft 52, a head 54 at one end of the shaft, and a point 56 at the other end of the shaft. A first portion 58 (adjacent the point 56) is threaded, and a second portion 60 (adjacent the head 54) is not threaded, but has three equally spaced rings 62, 63 and 65. The threaded portion 58 is about half the length of the shaft 52.

The head 54 can include any suitable drive, such at the square drive shown in FIG. 6. In this embodiment, there is no undercut on an inside edge 73 of the head, although one could be provided, if desired.

A type 17 shank slot 70 or the like is typically provided adjacent the tip 56, shown in FIGS. 5 and 7. FIG. 7 also shows that the threads 69 are formed in three radial lobes 64, each lobe spanning about 120° around the point 56.

As seen in FIG. 8, the threads 69 have one surface which forms about a 15° angle with a line 71 generally perpendicular to the axis of the shaft. That surface faces the point of the fastener. The opposite surface of the threads faces the head, and forms about a 5° angle with the line 71.

The rings 62, 63 and 65 are similar to the rings in the first embodiment, but are spaced differently along the shaft 52. In a No. 8 12 thread per inch screw, nominally 2.5 inches long, the ring 62 is located about 0.31-0.30 inches from a bearing surface 73 of the head, the ring 63 is located about 0.21-0.20 inches from the surface 73, and the ring 65 is located about 0.11-0.10 inches from the bearing surface 73. As with the first embodiment, different screw sizes and lengths would have rings spaced in similar proportions. For example, if the total length of the shaft from the bearing surface 73 to the point 56 is TL, then the ring 62 is located about 0.13 TL from the bearing surface 73, the ring 63 is located about 0.08 TL from the surface 73, and the ring 65 is located about 0.04 TL from the bearing surface 73.

In use, the fasteners of the present invention can be screwed into composite materials of varying densities without pre-drilling, and securely fasten the composite material to various substrates, without mushrooming or splitting the composite material.

While the principles of the invention have been described above in connection with specific apparatus and applications, it is to be understood that this description is made only by way of example and not as a limitation on the scope of the invention.

What is claimed is:

1. A fastener for composite material comprising:
a shaft having a longitudinal axis,
a head at a first end of the shaft, the head having an undercut edge which is inverted in a circular arc towards the head, the undercut edge being furthest from a top surface of the head at an outside portion of the head furthermost from the longitudinal axis, the undercut edge being closer to the top surface between the outside portion and the longitudinal axis
a point at a second end of the shaft opposite the first end,
a first portion of the shaft adjacent the point being threaded, and extending over a portion of a total length TL of the shaft, wherein the total length TL is measured from an inside surface of said head to said point, the threads and the first portion of the shaft having three radial lobes,
a second portion of the shaft adjacent the head not being threaded, said second portion having a plurality of spaced rings, the spaced rings reducing mushrooming of the composite material when the fastener is used in the composite material, and
a knurled portion between said first and second portions, wherein said knurled portion has a plurality of parallel teeth.

2. The fastener of claim 1 wherein said first portion has asymmetrical threads.

3. The fastener of claim 1 comprising three said rings, wherein said rings are unequally spaced with respect to each other.

4. The fastener of claim 1 comprising three of said rings, a first of said rings being located about 0.23 TL from said inside surface, a second of said rings being located about 0.16 TL from said inside surface, and a third of said rings being located about 0.07 TL from said inside surface.

5. The fastener of claim 1 comprising three said rings, wherein said rings are equally spaced with respect to each other.

6. The fastener of claim 1 comprising three of said rings, a first of said rings being located about 0.13 TL from said inside surface, a second of said rings being located about 0.08 TL from said inside surface, and a third of said rings being located about 0.04 TL from said inside surface.

* * * * *